(12) United States Patent
Rasch

(10) Patent No.: US 10,487,826 B2
(45) Date of Patent: Nov. 26, 2019

(54) INTEGRATED LUBRICATION PUMP

(71) Applicant: Danfoss Power Solutions GmbH & Co. OHG, Neumunster (DE)

(72) Inventor: Harry Rasch, Seedorf (DE)

(73) Assignee: Danfoss Power Solutions GmbH & Co., OHG, Neumunster (DE)

(*) Notice: Subject to any disclaimer, the term of this patent is extended or adjusted under 35 U.S.C. 154(b) by 334 days.

(21) Appl. No.: 14/751,697

(22) Filed: Jun. 26, 2015

(65) Prior Publication Data
US 2015/0377233 A1 Dec. 31, 2015

(30) Foreign Application Priority Data

Jun. 30, 2014 (DE) .................. 10 2014 212 600

(51) Int. Cl.
*F16N 7/38* (2006.01)
*F04B 53/18* (2006.01)
*F04B 1/24* (2006.01)
*F04B 1/12* (2006.01)

(52) U.S. Cl.
CPC .............. *F04B 53/18* (2013.01); *F04B 1/124* (2013.01); *F04B 1/128* (2013.01); *F04B 1/24* (2013.01); *F16N 7/385* (2013.01)

(58) Field of Classification Search
CPC ........ F04B 53/18; F04B 1/24; F16H 61/4139; F02F 1/00; F16N 7/385; F16N 13/18
USPC ................................. 184/6.17, 6.13
See application file for complete search history.

(56) References Cited

U.S. PATENT DOCUMENTS

| 2,173,432 A | * | 9/1939 | Benedek | ............... F01B 1/0668 91/494 |
| 2,208,568 A | * | 7/1940 | Benedek | ............... F01B 1/0675 417/271 |
| 2,406,599 A | * | 8/1946 | Folke | ..................... F16N 13/10 184/27.1 |
| 2,457,101 A | * | 12/1948 | Horton | .................. F04B 1/0413 285/910 |
| 2,825,499 A | | 3/1958 | Gibson et al. | |

(Continued)

FOREIGN PATENT DOCUMENTS

| AT | 393 879 B | 12/1991 |
| CN | 1104300 U | 6/1995 |

(Continued)

*Primary Examiner* — Peter J Bertheaud
*Assistant Examiner* — Geoffrey S Lee
(74) *Attorney, Agent, or Firm* — McCormick, Paulding & Huber LLP

(57) ABSTRACT

The invention relations to a hydraulic machine of the Dry-Case construction type comprising a hydraulic machine housing for receiving a hydrostatic driving mechanism for conveying hydraulic fluid with a driving shaft operational connected with the driving mechanism. The driving shaft is mounted rotatable about its longitudinal axis in the hydraulic machine housing. Neither the driving mechanism, nor the driving shaft nor its bearings splash or move in a sump of the hydraulic fluid. Lubricant can be pumped to bearings of the driving shaft and to the driving mechanism by a lubrication pump arranged on the driving shaft and being driven by driving shaft. The lubrication pump do not splash in a sump of the hydraulic fluid either and comprise a suction port which leads to a hydraulic fluid reservoir.

12 Claims, 2 Drawing Sheets

(56) References Cited

U.S. PATENT DOCUMENTS

| | | | | |
|---|---|---|---|---|
| 2,870,746 | A * | 1/1959 | Keel | F01B 3/106 91/172 |
| 2,956,512 | A * | 10/1960 | Brundage | F04C 2/102 418/132 |
| 3,335,672 | A * | 8/1967 | Raymond | F04B 1/126 417/270 |
| 3,426,686 | A * | 2/1969 | Anderson | F04B 1/2064 417/201 |
| 3,693,508 | A * | 9/1972 | Chondzinski | F01B 3/0064 91/499 |
| 4,462,773 | A * | 7/1984 | Erasov | F16J 15/3496 418/104 |
| 4,478,134 | A * | 10/1984 | Kawahara | F04B 1/2092 91/488 |
| 4,550,645 | A * | 11/1985 | Beck, Jr. | F04B 1/2042 29/888.02 |
| 5,545,013 | A * | 8/1996 | Beck | F04B 1/2014 417/201 |
| 5,862,664 | A * | 1/1999 | Ohashi | F16H 61/4139 418/131 |
| 6,352,017 | B1 * | 3/2002 | Ryuh | F04B 1/2078 92/129 |
| 8,528,594 | B2 * | 9/2013 | Gollner | F04B 23/04 137/314 |
| 2004/0011031 | A1 * | 1/2004 | Gray, Jr. | B60K 6/12 60/325 |
| 2005/0207921 | A1 * | 9/2005 | Gray, Jr. | B60K 6/12 417/437 |
| 2006/0054416 | A1 * | 3/2006 | Vallebrant | F04B 1/24 184/14 |
| 2007/0271914 | A1 | 11/2007 | Bar et al. | |
| 2009/0272596 | A1 * | 11/2009 | Thomson | B60K 7/0015 180/305 |
| 2011/0079293 | A1 * | 4/2011 | Gollner | F04B 23/04 137/312 |
| 2012/0031089 | A1 * | 2/2012 | Achten | B60K 6/12 60/459 |
| 2014/0150641 | A1 * | 6/2014 | Ruckgaber | F04B 1/124 91/505 |
| 2015/0030471 | A1 * | 1/2015 | Miyata | F04B 1/24 417/269 |
| 2015/0354355 | A1 * | 12/2015 | Goellner | F01B 3/0023 92/12.2 |

FOREIGN PATENT DOCUMENTS

| | | |
|---|---|---|
| CN | 202954965 U | 5/2013 |
| DE | 4128615 C1 | 1/1993 |
| DE | 4215869 C1 | 9/1993 |
| DE | 19613609 A1 | 10/1997 |
| DE | 10 2009 048 099 A1 | 6/2011 |
| GB | 487169 A | 6/1938 |

* cited by examiner

INTEGRATED LUBRICATION PUMP

CROSS REFERENCE TO RELATED APPLICATION

Applicant hereby claims foreign priority benefits under U.S.C. § 119 from German Patent Application No. DE 102014212600.2 filed on Jun. 30, 2014, the contents of which are incorporated by reference herein.

TECHNICAL FIELD

The invention relates to hydraulic machines with rotating hydrostatic driving mechanisms, particularly of the radial or axial piston construction type. The invention relates particularly to hydraulic machines of the Dry-Case-type, i.e. to hydraulic machines, whose rotational parts, in particular, the parts of the driving mechanism do not splash in a sump of oil, since run in a housing or in a portion of a housing free of oil.

BACKGROUND

In the meaning of the invention "oil-free housing" or "oil-free portion of a housing" means that in general no oil or hydraulic fluid is present in the housing or in the corresponding housing area or that the level of oil or the hydraulic fluid in the housing is located below the moving and rotating parts of the hydraulic machine. In this sense oil or hydraulic fluid-free however means that in this mentioned areas leakage fluid and/or lubrication oil is present and drops, if applicable, into a hydraulic fluid collecting area. Here, for such "dry" moving hydraulic machines the term Dry-Case machines was established by the relevant circle of experts in the art and will be used furthermore in the description of the invention.

Hydraulic machines of the Dry-Case-type of construction comprise the advantage over hydraulic machines, whose housings are filled with hydraulic fluid or oil, that loss of power can be avoided due to parts of the driving mechanism rotating and splashing in the oil. Further, air inclusion in the oil sump caused by the permanent stirring of the hydraulic fluid is avoided, whereby the overall necessary quantity of oil can be reduced. In Dry-Case hydraulic machines no partial quantities of hydraulic fluid, which are stirred foamy, are present and which "liquefaction" has to be waited for, before the hydraulic fluid can be provided air-free to a working circuit again. However, in dry-ruining Dry-Case hydraulic machines the problem of lubrication of the moving and rotating machine- and driving mechanism parts exists. For hydraulic machines, whose housings are filled with hydraulic fluid the former addressed problem of the lubrication of the parts movable relative to each other does not arise.

In DE 10 2009 048 099 B4 a Dry-Case hydraulic machine is described which is moving in an oil-free housing, whereby the lubrication of the moving machine parts is effected via leakage oil. Especially in machines, whose bearing positions of the driving shaft is spaced from the hydrostatic driving mechanism, it was seen that the lubrication of this bearings by leakage fluid is complicated and sometimes lubrication effected by leakage is not sufficient.

Therefore, it is an object of the invention to provide a simple and efficient possibility to supply to all machine parts of a hydraulic machine with an oil-free housing, which are being rotatable or movable relative to each other, with lubricant, whereby a reliable, robust and cost efficient supply with lubricant of the moving machine parts should be guaranteed.

SUMMARY

The object according to the invention is solved by a hydraulic machine of the Dry-Case construction type comprising a hydraulic machine housing for receiving a hydrostatic driving mechanism for conveying hydraulic fluid comprising a driving shaft operational connected with the driving mechanism, whereby the driving shaft is mounted rotatable about its longitudinal axis in the hydraulic machine housing and neither the driving mechanism, nor the driving shaft nor its bearings splash or move in a sump of the hydraulic fluid, wherein, lubricant can be pumped to bearings of the driving shaft and to the driving mechanism by a lubrication pump arranged on the driving shaft and being driven by driving shaft, whereby the lubrication pump do not splash in a sump of the hydraulic fluid either and comprise a suction port which leads to a hydraulic fluid reservoir.

The hydraulic machine according to the invention is of the Dry-Case construction-type and shows in its oil-free housing a driving shaft being rotatable mounted by means of at least one bearing. Thereby, neither the driving mechanism nor the driving shaft nor the bearings of the driving shaft nor the driving mechanism move in a sump of hydraulic fluid or splash therein. According to the invention, a lubrication pump is provided on the driving shaft and being driven by the driving shaft. Thereby, the lubrication pump is preferably arranged on the driving shaft such that the lubrication pump does not splash in a sump of hydraulic fluid either. In order that the lubrication pump could convey lubricant or hydraulic fluid to the driving mechanism, e.g. to the bearing positions of the driving shaft, the lubrication pump shows a suction port leading to a reservoir of hydraulic fluid. Further, the lubrication pump comprises outlet ports with which lubricant can be directed to machine parts which are movable relative to other parts of the hydraulic machine. Preferably, the inventive lubrication pump integrated into hydraulic machine conveys hydraulic fluid as lubricant, by what a mixing of lubricant with leakage fluid is not problematic. According to the invention, every kind of pump being able to convey fluids can be used as lubrication pump. Hereby, in particular, gerotor, internal gear or vane pumps are to be mentioned, which are being used according to the invention and which are being driven by the driving shaft of the hydraulic machine.

Further according to the invention, the lubrication pump comprises outlet ports for lubricant being adjacent to machine parts being movable relative to other machine parts. According to the invention, lines for lubricants can be provided, e. g. within the housing of the hydraulic machine and with which the lubricant conveyed by the lubrication pump is conveyed to elements of the hydraulic machine foreseen to be lubricated. For those elements, which are to be lubricated, the bearings of the driving shaft and the driving mechanism itself have to be mentioned, in particular.

In the broadest sense, a driving mechanism according to the invention is a hydraulic machine, for instance a cylinder block of an axial piston machine, in which commonly a plurality of axial pistons are arranged movable in eccentric cylinder bores aligned parallel to the cylinder axis. A displacement of the axis of the cylinder or a displacement of a so-called swashplate with respect to the axis of the driving shaft causes the piston stroke. Depending on the displacement angle (deflection) the stroke volume of one piston per revolution of the driving shaft can be adjusted. From this it can be seen, that the movement of the pistons in the cylinder bores as well as the guidance of the rotating cylinder block or of the axial pistons supported against a swashplate should be lubricated in order to avoid losses due to friction or to avoid damages on the elements of the hydraulic machine. The same is applicable for all further elements of a hydraulic machine which move relative to each other, for instance bearing elements with respect to its bearing shells.

In addition, every hydraulic machine comprises an input or an output shaft, which are, in the sense of the invention, denoted as driving shaft. Such a driving shaft is mounted rotatable about its shaft axis by at least one shaft bearing, usually to be lubricated as well. Hereby, roller or friction bearings are used, whereas in some cases also hydrodynamic bearings are used. In the most cases common bearing types known from the state of the art are used, in particular, roller or friction bearings, whereby taper roller bearings and cylinder roller bearings as well as needle roller bearings are to be mentioned as representatives. However, the spirit of invention covers all kinds of shaft bearings. In a preferred embodiment, the lubrication pump is arranged adjacent to the at least one bearing of the driving shaft of the hydraulic machine. A lubricant line forwards the lubricant conveyed by the lubrication pump with an outlet preferably directly adjacent to the bearing, which is to be lubricated, whereby lubricant is enabled to flow into the bearing or maintains the pressure in the hydrodynamic bearing.

In a further preferred embodiment the lubrication pump is arranged between two bearing areas of a driving shaft of the hydraulic machine and conveys lubricant to both bearings, for example via openings arranged in the housing of the lubrication pump. Further preferred, in this embodiment, the lubrication pump is arranged between both bearings such that the axial width of the housing of the lubrication pump corresponds to the axial distance of the bearings. In such an arrangement of the invention the housing of the lubrication pump substitutes a bearing distance ring or a housing shoulder within the housing of the hydraulic machine, in order to define a distance between the two bearings of the driving shaft. Hereby, the two outer rings of the bearings abut preferably on the housing of the lubrication pump. Further preferred, a thread is provided on the driving shaft of the hydraulic machine with which the axial gap between the two shaft bearings can be adjusted by means of a shaft nut.

In another preferred embodiment the lubrication pump is integrated according to the invention in the swash plate of an axial piston machine of the swashplate-construction type, whereby, for example, the housing of the lubrication pump forms part of the swashplate. With such an embodiment a very compact construction type is achieved, whose construction is not only short in axial direction with regard to the driving shaft since also small in radial direction. In a simple embodiment the axial piston machine is an axial piston pump with a constant conveying volume or an axial piston motor comprising a constant displacement. However, the scope of the invention covers as well adjustable hydraulic machines of the axial piston as well as of the radial piston construction type as well as of the gearing construction type. Like every pump, the lubrication pump used according to the invention also comprises elements which rotate relative to each other in order to create a pump effect by cavity reduction during rotation. According to the invention, the elements rotating with respect to the housing of the hydraulic machine are driven directly or indirectly by the driving shaft of the hydraulic machine, whereby elements being stationary to them are fixed at or in the housing of the hydraulic machine, respectively.

The lubrication pump sucks lubricant, preferably hydraulic fluid, out of a hydraulic fluid reservoir or an oil sump and conveys it to places which have to be provided with lubricant. Preferred further the reservoir for hydraulic fluid is arranged at the lowest point of the housing of the hydraulic machine. In a further embodiment the reservoir for lubricant or hydraulic fluid is arranged outside of the hydraulic machine and is connected with the lubrication pump by a lubricant line.

The pressures being producible by the lubrication pump for the supply of lubricant for machine elements which have to be lubricated need not to be very high, since often a moistening with lubricant is sufficient. However, the spirit of the invention covers also the supply of hydro-dynamic bearings via the lubrication pump. Hereby, the lubrication pump has to generate higher pressures in order to maintain the hydrodynamic lubrication film.

Independently of the construction type of the hydraulic machine and independently of whether this machine is operated as hydraulic pump or as a hydraulic motor, the inventive arrangement of a lubrication pump on the driving shaft of the hydraulic machine can be used. According to the invention the lubrication pump is driven by the driving shaft of the hydraulic machine and, preferably, is of a simple constructed conveying pump showing a suction port which leads to a reservoir of hydraulic fluid.

BRIEF DESCRIPTION OF THE DRAWINGS

With the help of the following figures a preferred embodiment of the inventive arrangement of a lubrication pump on a driving shaft of a hydraulic machine should be explained exemplarily, whereby the scope of invention is not limited by the explanations. It is shown.

DETAILED DESCRIPTION

Figure 1:
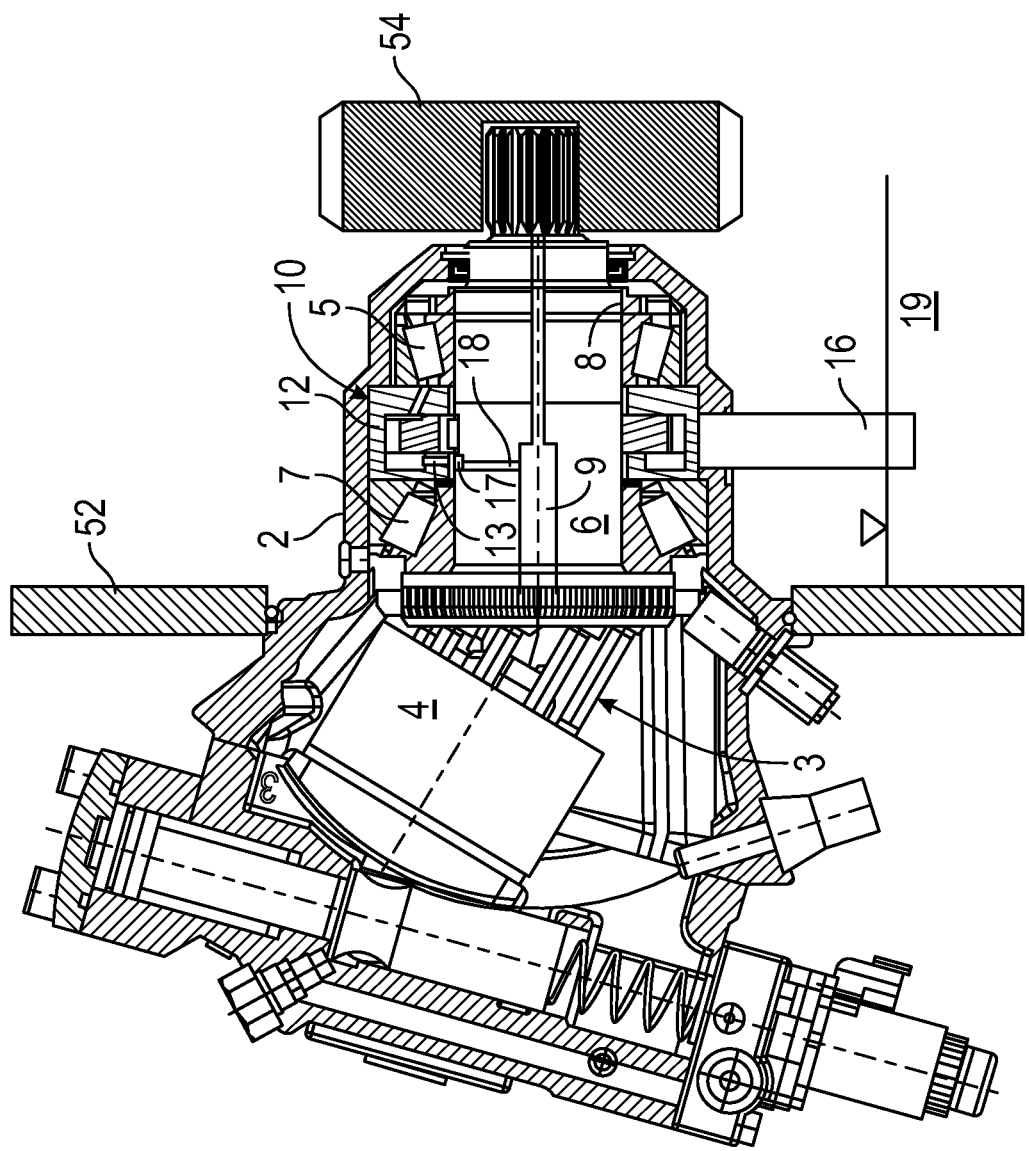
FIG. 1 a first embodiment of the inventive arrangement of a lubrication pump.

In FIG. 1 mere exemplarily a bent axis-axial piston machine is shown comprising a hydraulic machine housing 2 in which a driving mechanism 3 with a cylinder block 4 and a driving shaft 6 are arranged operatively connected to each other. Via the cylinder block 4 and the pistons arranged axially with respect to the axis of the cylinder block driving shaft 6 can be driven rotatable, if the pistons are suitably enforced with hydraulic fluid under pressure. The general work principle of a hydraulic machine is assumed to be commonly known and should not be described here in detail, therefore.

Commonly, driving shaft 6 is mounted axially and radially fixed in the hydraulic machine housing 2, however, rotatable supported with regard to its length axis. The roller bearings shown in FIG. 1 are only exemplarily and representative for all kind of shaft bearings. Between the two shaft bearings 5 and 7 a lubrication pump 10 is arranged, which sucks hydraulic fluid via a suction port 16 out of a lower area of a machine housing, e. g. a gear box housing 52. Lubrication pump 10 conveys hydraulic fluid exemplarily to the two bearings 5 and 7 and to the connection area of the driving mechanism 3 and the driving shaft 6. Although, in FIG. 1 further lubricant lines are not shown, such lines are covered by the spirit of the invention, in particular, lubricant lines leading to the connection or supporting surface of the cylinder block 4 on the pressure plate of the hydraulic machine.

Figure 2:
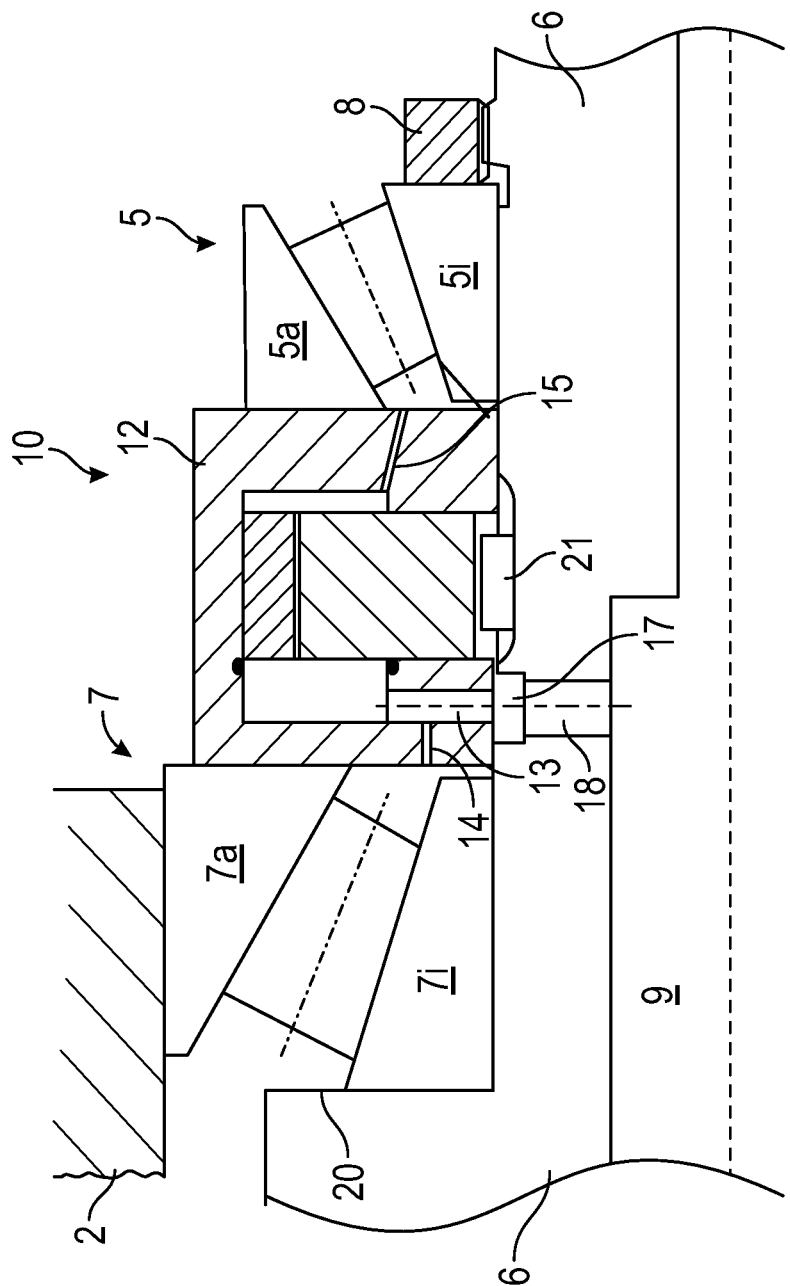
FIG. 2 a section detail of the embodiment of a lubrication pump shown in FIG. 1.

In FIG. 2 an enlarged view of the arrangement of the lubrication pump 10 between the two bearings 5 and 7 is shown. Here it can be seen, that the two bearings outer rings 5*a* and 7*a* abuts on the lubrication pump housing 12, hereby defining the bearing distance between the two bearings 5 and 7. By means of a single shaft nut 8 the axial clearance between the two bearings 5 and 7 can be adjusted via the lubrication pump housing 12, whereby the bearing inner ring 7*i* of bearing 7 abuts against a shaft shoulder 20.

The lubrication pump 10 shown in FIG. 2 is shown exemplarily as an internal gear pump, whereby every kind of a fluid-conveying-pump in the inventive arrangement can be used. Via lubricant outlet channels 14 and 15 both bearings 5 and 7 can be provided with lubricant. Also, the supply to a hydrodynamic bearing via lubrication pump 10 is covered by the spirit of the invention.

The driving shaft 6 shown in FIG. 2 comprise a central bore 9 via which lubricant from the lubrication pump 10 could be guided to driving mechanism 3. Hereby, a further lubricant outlet channel 13 is provided, which opens into a groove 17 of driving shaft 6, which groove 17 is connected with the central bore 9 of driving shaft 6 via a radial conducted cross bore 18. Consequently, during the operation of the hydraulic machine hydraulic fluid sucked from a hydraulic fluid reservoir 19 can be conveyed by the lubrication pump 10 to the machine parts of driving mechanism 3 rotating and movable relative to each other or to other bearing areas, e. g. to the pressure plate. Via central bore 9 in the driving shaft 6 hydraulic fluid/lubricant can, as commonly known, be guided also into other areas of the hydraulic machine, to which the above mentioned embodiment does not refer to or, respectively, which are not shown in the Figures.

As already mentioned, the embodiment of an axial piston machine of the bent axis construction type shown in the Figures is only an exemplary embodiment for the inventive arrangement of an integrated lubrication pump in a hydraulic machine. For a person skilled in the art it is easily apparent that the inventive arrangement is also applicable to other construction types of axial piston machines or for radial piston or vane pumps, whereby the invention is delimit preferably to hydraulic machines being hydraulic motors or hydraulic pumps.

What is claimed is:

1. A hydraulic machine of the Dry-Case construction type comprising a hydraulic machine housing for receiving a hydrostatic driving mechanism for conveying hydraulic fluid comprising a driving shaft operationally connected with the driving mechanism, whereby the driving shaft is mounted rotatable about its longitudinal axis in the hydraulic machine housing and neither the driving mechanism, nor the driving shaft nor two bearings of the driving shaft splash or move in a sump of the hydraulic fluid, wherein lubricant can be pumped to the two bearings of the driving shaft and to the driving mechanism by a lubrication pump arranged on the driving shaft and being driven by the driving shaft, whereby the lubrication pump does not splash in the sump of the hydraulic fluid and comprises a suction port which leads to a hydraulic fluid reservoir, wherein the driving shaft of the hydraulic machine is supported by the two bearings of the driving shaft in between which the lubrication pump is arranged, and wherein the two bearings of the driving shaft and the lubrication pump arranged in between are fixed axially against a stopper on the driving shaft by means of a shaft nut engaging threads on the driving shaft whereby the axial clearance of the two bearings of the driving shaft is adjustable by the shaft nut.

2. The hydraulic machine according to claim 1, wherein the axial width of the lubrication pump corresponds to the axial distance of the two bearings on the driving shaft and wherein a lubrication pump housing is fixed with respect to the driving shaft axially and with regard to the hydraulic machine housing rotatable by means of the external bearing shells of the two bearings respectively.

3. The hydraulic machine according to claim 2, wherein the bearings of the driving shaft are roller or friction bearings.

4. The hydraulic machine according to claim 2, wherein one of the bearings of the driving shaft is a hydrodynamic friction bearing.

5. The hydraulic machine according to claim 1, wherein the bearings of the driving shaft are roller or friction bearings.

6. The hydraulic machine according to claim 5, wherein one of the bearings of the driving shaft is a hydrodynamic friction bearing.

7. The hydraulic machine according to claim 1, wherein one of the bearings of the driving shaft is a hydrodynamic friction bearing.

8. The hydraulic machine according to claim 1, wherein the hydraulic fluid reservoir is adjacent to the lowest point of the hydraulic machine housing.

9. The hydraulic machine according to claim 1, wherein the hydraulic fluid reservoir is arranged externally of the hydraulic machine housing.

10. The hydraulic machine according to claim 1, wherein the lubrication pump is a hydrostatic or hydrodynamic pump.

11. The hydraulic machine according to claim 1, wherein the hydraulic machine is a radial piston machine or an axial piston machine, in the bent axis or swashplate construction type.

12. The hydraulic machine according to claim 1, wherein the lubrication pump is fluidly connected with a central bore of the driving shaft.

* * * * *